Feb. 5, 1929.
A. F. HAHNER
1,701,325
AUTOMATIC SPRING WHEEL
Filed July 21, 1926
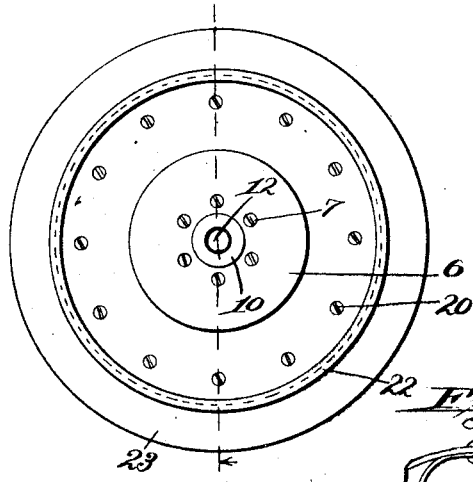
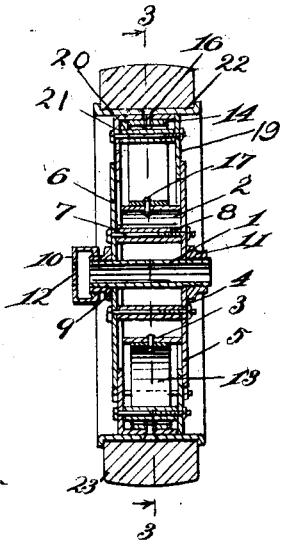
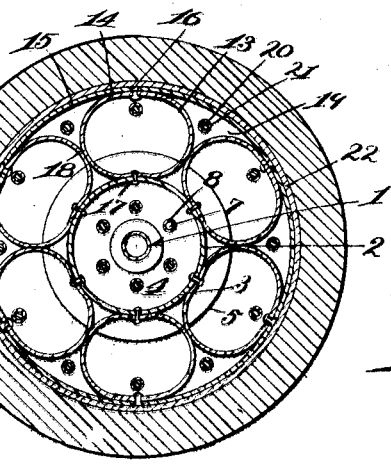
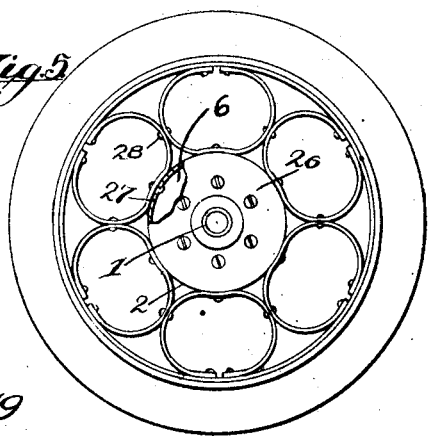
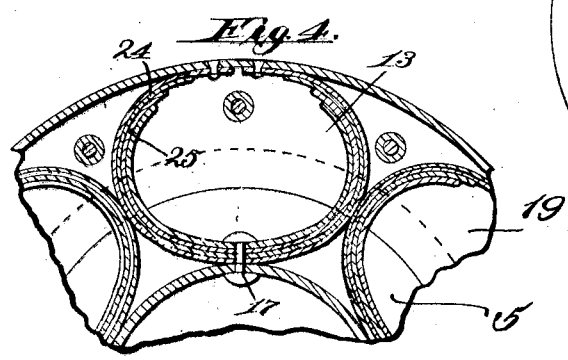
Inventor
August Frank Hahner
by Hazard and Miller
Attorneys Patented Feb. 5, 1929.

1,701,325

UNITED STATES PATENT OFFICE.

AUGUST FRANK HAHNER, OF LOS ANGELES, CALIFORNIA, ASSIGNOR OF FORTY PER CENT TO WILLIAM LEO STANGLER, OF LOS ANGELES, CALIFORNIA.

AUTOMATIC SPRING WHEEL.

Application filed July 21, 1926. Serial No. 123,895.

My invention is an automatic spring wheel comprising a spring arrangement to form a resilient wheel.

An object of my invention is mounting a series of springs between a hub and a rim or felly of a wheel, these springs being constucted to co-act one with the other and form a resilient or spring acting wheel.

A more specific object of my invention is utilizing substantially ring-like springs attached on one side to the rim or felly of a wheel and attached on the other side to a hub, the axle extending through the hub and either being rigidly connected thereto for a driving wheel or journaled in the hub for a fixed axle.

In constructing my spring wheel I utilize preferably a hollow hub or a hub having a flange and attach springs to the rim or felly of the wheel, these springs being bent into substantially a ring with their outside portion secured to the rim or felly and the opposite side secured to the flange. The rings are preferably sufficient in number so that they touch each other. Therefore when there is relative movement of the hub towards the felly due to weight put on the axle or a bump or jar, and one spring is compressed, the action is carried to the other spring.

Moreover, in my construction the springs act both by compression and tension. When due to the weight of a load or other circumstances the springs on one side of the wheel are compressed, those on the other side are tensioned and in my construction I may form the rings of a plurality of separate leaves connected together.

My invention will be more readily understood from the following description and drawings, in which:

Figure 1 is a side elevation of a wheel constructed in accordance with my invention, illustrating a type of disc wheel in which the springs are enclosed;

Fig. 2 is a section transversely through the wheel on the line 2—2 of Fig. 1;

Fig. 3 is a longitudinal section through the wheel on the line 3—3 of Fig. 2;

Fig. 4 is a modified construction showing the spring rings made of a plurality of segmental springs fitted together;

Fig. 5 is an elevation of a slightly modified type of wheel, showing an open construction and with the adjacent spring rings secured together;

Fig. 6 is a detail showing part of the wheel of another slight modification in which the springs are made as complete rings or hoops.

The axle and hub constructions are substantially as follows, the axle being designated generally by the numeral 1 and illustrated as tubular, this having a hub 2 with a flange 3 extending from a disc section 4, there being an extension 5 of the disc section beyond the flange, the flange being concentric to the axle. A cover plate 6 is secured to the disc of the hub by means of bolts 7 which extend through sleeves 8. In the type of axle illustrated, a collar 9 is secured on one side of the hub having a cap 10 threaded thereon and a nut 11 screwed on the other end of the axle holds same in tight relation to the hub. If desired the cap may have an opening 12 therethrough for a stationary or driven axle.

The springs 13 are shown in the form of a ring having their outside portion 14 secured to the felly 15 by rivets 16 or the like and having a riveted connection 17 with the flange 3 of the hub. It will be noted that the sides 18 of adjacent springs contact.

In the construction shown in Figs. 1, 2 and 3, the felly has connected thereto inwardly turned sides 19 which fit underneath the extension 5 of the hub construction and inside the cover plate 6. In order to brace these sides they are secured together by bolts 20 passing through sleeves 21. In this construction it is desirable to form the felly and the side walls integral.

A rim 22 of any suitable character would preferably be secured to the felly 15 and may if desired have a rubber or other resilient tire 23 secured thereto.

In the construction of Fig. 4 the springs 13 are constructed with a main or outer ring 24, and with a series of segmental rings 25, these diminishing in length and thereby forming a multiple spring secured to the flange of the hub by a substantial rivet 17. In this construction it is also desirable to have the outer rings of the spring contacting with adjacent springs.

In Fig. 5 I illustrate a construction by which the extension 5 of the hub is omitted and the cover plate 6 ends at substantially the flange of the hub. In this case it is desirable to make the disc section 26 and the flange section 27 of the hub integral. The side walls 19 of the felly are also omitted so that the springs are exposed. In this construction I illustrate the adjacent springs being secured together by rivets 28 or the like in order to give a stiffer construction.

The manner of action of my wheel is substantially as follows:

It will be readily seen that when weight is put on the axle and the wheel bearing on the ground, that the lower spring will be compressed and the uppermost spring tensioned and also that as the lowermost spring is spread out it bears against the adjacent springs at each side and distorts same, this distortion is carried completely around the wheel. As the wheel rolls over the ground the successive lower spring becomes compressed and spreads and all the springs contacting become distorted, each spring transmitting a stress to the next adjacent. If the wheel undergoes a violent bump, the lower springs are merely compressed to a greater extent and the upper springs elongated or tensioned to a greater extent than in normal running and the action of the springs is transmitted completely around the wheel.

In the construction of Fig. 4 a stronger and stiffer wheel is shown than that shown in the other figures, which may be more suitable for heavy truck work. It is to be understood that in this construction the sides or coverings of the wheel may be eliminated.

In the construction of Fig. 5, as the adjacent springs are secured together by rivets, the compressive stresses or the tension stresses from opposite springs are directly transmitted to the springs adjacent thereto, causing a distortion of same.

In the open wheel of the type of Fig. 5, it is desirable that the springs be of considerable width relative to the diameter of the wheel in order to withstand side stresses as when a vehicle makes a rapid turn or bumps against a curb or other object on the side.

It is also obvious by my construction that the resilient wheel will transmit power from the axle as on a driving wheel, as well as act as a loose wheel on a fixed axle or shaft.

Although I have illustrated the wheel with comparatively few springs, it is to be understood that these may be increased in number or diminished if desired and also that the general construction and specific details may be changed to suit different types of wheels. Such changes would be within the spirit of my invention as set forth in the description, drawings and claims.

In Fig. 6 the springs 45 are formed as complete rings or hoops and are preferably secured to the rim by a single rivet 46 instead of the two rivets securing the two ends as shown in Figs. 4 and 5, these having a rivet for securing the opposite side of the spring to the hub structure.

Having described my invention, what I claim is:

1. A spring wheel comprising in combination an axle, a hub secured thereto, said hub having a disc extending radially from the axle, a flange concentric with the axle and an extension of the disc beyond the flange, a cover plate secured to the disc of the hub, a felly, a plurality of ring like springs secured between the flange of the hub and the felly, said felly having inturned sides extending radially and fitting underneath the extension of the disc and cover plate, and a rim secured to the felly.

2. A spring wheel comprising in combination an axle, a hub having a flange concentric therewith, a plurality of ring like springs each formed of nested leaves, the inner leaves being shorter than the outer leaves, means securing the inner leaves to the flange of the hub at about their mid-position, a felly, means securing the outer ends of the outer leaves to the felly, adjacent springs contacting, the felly having inturned sides extending radially, and there being plates extending from the hub radially outwardly and overlapping the inturned sides of the felly, and a rim secured to the felly.

3. A spring wheel comprising in combination an axle, a hub having a disc with a flange concentric with the axle and an extension beyond said flange, a cover plate bolted to the disc and spaced therefrom by sleeves, a plurality of rings formed of leaf springs nested together, the inner leaves being shorter than the outer leaves, said leaves being secured to the flange at about their mid-position, a felly, the ends of the longer leaves being secured to said felly, the felly having inturned sides extending inside of the extension of the disc and the cover plate, said inturned sides being spaced apart by bolts, with sleeves surrounding the bolts, and a rim secured to the felly.

In testimony whereof I have signed my name to this specification.

AUGUST FRANK HAHNER.